A. D. MARTIN.
RIDGE-FORMING MACHINES.
No. 179,933. Patented July 18, 1876.
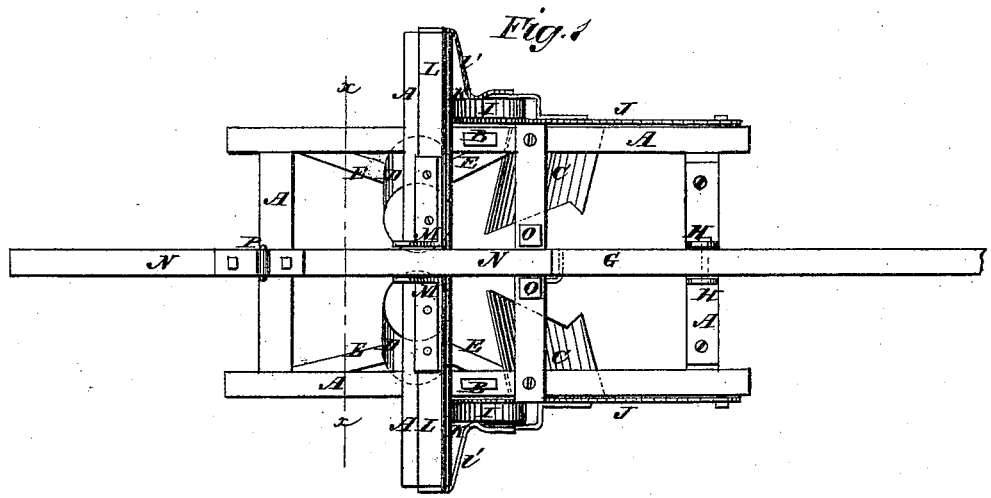
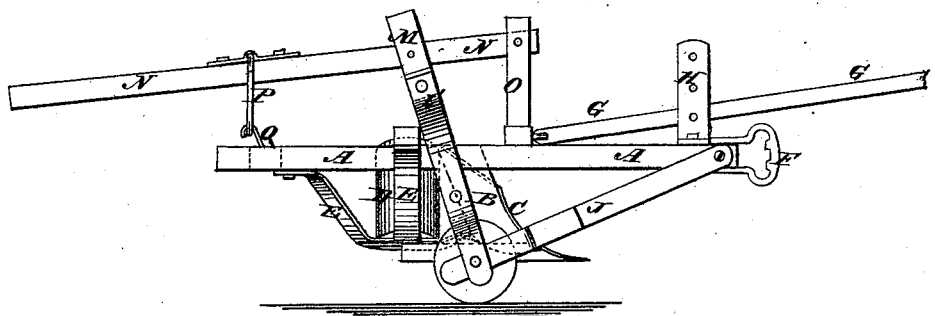
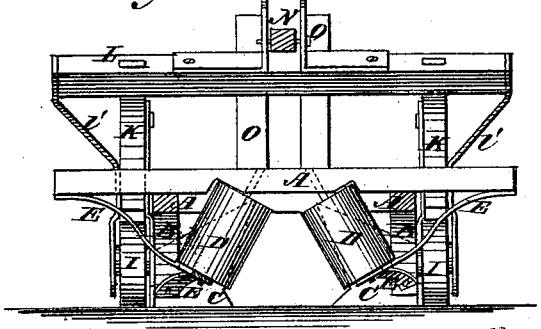
WITNESSES:
Francis McArdle.
John Goethals
INVENTOR:
A. D. Martin
BY
ATTORNEYS.

UNITED STATES PATENT OFFICE.

ANDREW D. MARTIN, OF ABBEVILLE, LOUISIANA.

IMPROVEMENT IN RIDGE-FORMING MACHINES.

Specification forming part of Letters Patent No. 179,933, dated July 18, 1876; application filed May 22, 1876.

*To all whom it may concern:*

Be it known that I, ANDREW D. MARTIN, of Abbeville, Vermillion parish, and State of Louisiana, have invented a new and Improved Ridge-Forming Machine, of which the following is a specification:

In the accompanying drawing, Figure 1 is a top view of my improved machine. Fig. 2 is a side view of the same; and Fig. 3 is a rear view of the same.

Similar letters of reference indicate corresponding parts.

The object of my invention is to furnish a machine for forming ridges for planting sweet potatoes, which shall be simple in construction and effective in operation, forming a ridge at each passage across the field.

My invention consists in the combination of the plows and the two inclined rollers with each other, and with the frame of the machine, and in the combination of the wheels, the draw-bars, the standards, the cross-bar, and the lever, with the frame to which the plows and the inclined rollers are attached, as hereinafter fully described.

In the annexed drawing, A is a frame, to the middle parts of the side bars of which are attached the standards B. To the standards B are attached two very large plow-plates, C, which are made right and left, so as to throw the soil toward each other to form a ridge. D represents two rollers, the upper ends of which incline toward each other, and are pivoted to a cross-beam of the frame A. The lower ends of the rollers D are pivoted to spiders E, the arms of which incline upward, and are attached to the frame A. The rollers D may be made cylindrical, as shown in the drawings, or conical, as may be desired. To the forward cross-bar of the frame A is attached the clevis F, to which the draft is applied. The machine is guided by the tongue G, the rear end of which is hinged to the middle cross-bar of the frame A, and which passes between two standards, H, attached to the front cross-bar of said frame A. In the standards H are formed a number of holes to receive a pin which passes through the tongue G, to support it at any desired position, to cause the plow to work deeper or shallower in the ground. I represents two small wheels placed at the outer sides of the plows B C, and the journals of which revolve in the slotted rear ends of the draw-bars J, and in the slotted lower ends of the standards K. The forward ends of the draw-bars J are pivoted to the outer sides of the forward ends of the side bars of the frame B. The upper ends of the standards K are attached to and connected by a cross-bar, L, and the connection is strengthened by the braces *l'* attached to the said standards, and to the projecting ends of the cross-bar L. To the middle part of the cross-bar L are attached two uprights, M, to and between which is pivoted the lever N. The forward end of the lever N is pivoted to and between the upper ends of two uprights, O, attached to the middle cross-bar of the frame A. The rear end of the lever N projects in the rear of the machine, so that it may be readily reached and operated by the plowman. By this construction, by bearing down upon the rear end of the lever N, the frame A will be raised, raising the plows B C from the ground, so that the machine may be readily turned, and drawn from place to place. To the lever N is attached a link or chain, P, to hook upon a hook, Q, attached to the rear cross-bar of the frame A, to lock the said lever in place, when adjusted, to hold the plows away from the ground, and at any desired depth in the ground.

Having thus described my invention, what I claim as new, and desire to secure by Letters Patent, is—

1. The combination of the plows B C and the two inclined rollers D with each other, and with the frame A, substantially as herein shown and described.

2. The combination of the wheels I, the draw-bars J, the standards K, the cross-bar L, and the lever N, with the frame A, to which the plows B C and the inclined rollers D are attached, substantially as herein shown and described.

ANDREW D. MARTIN.

Witnesses:
 CESAIRE DEROUEN,
 WM. MOUTON.